Dec. 15, 1931.  G. A. HUMASON ET AL  1,836,470
BLOW-OUT PREVENTER
Filed Feb. 24, 1930   2 Sheets-Sheet 2

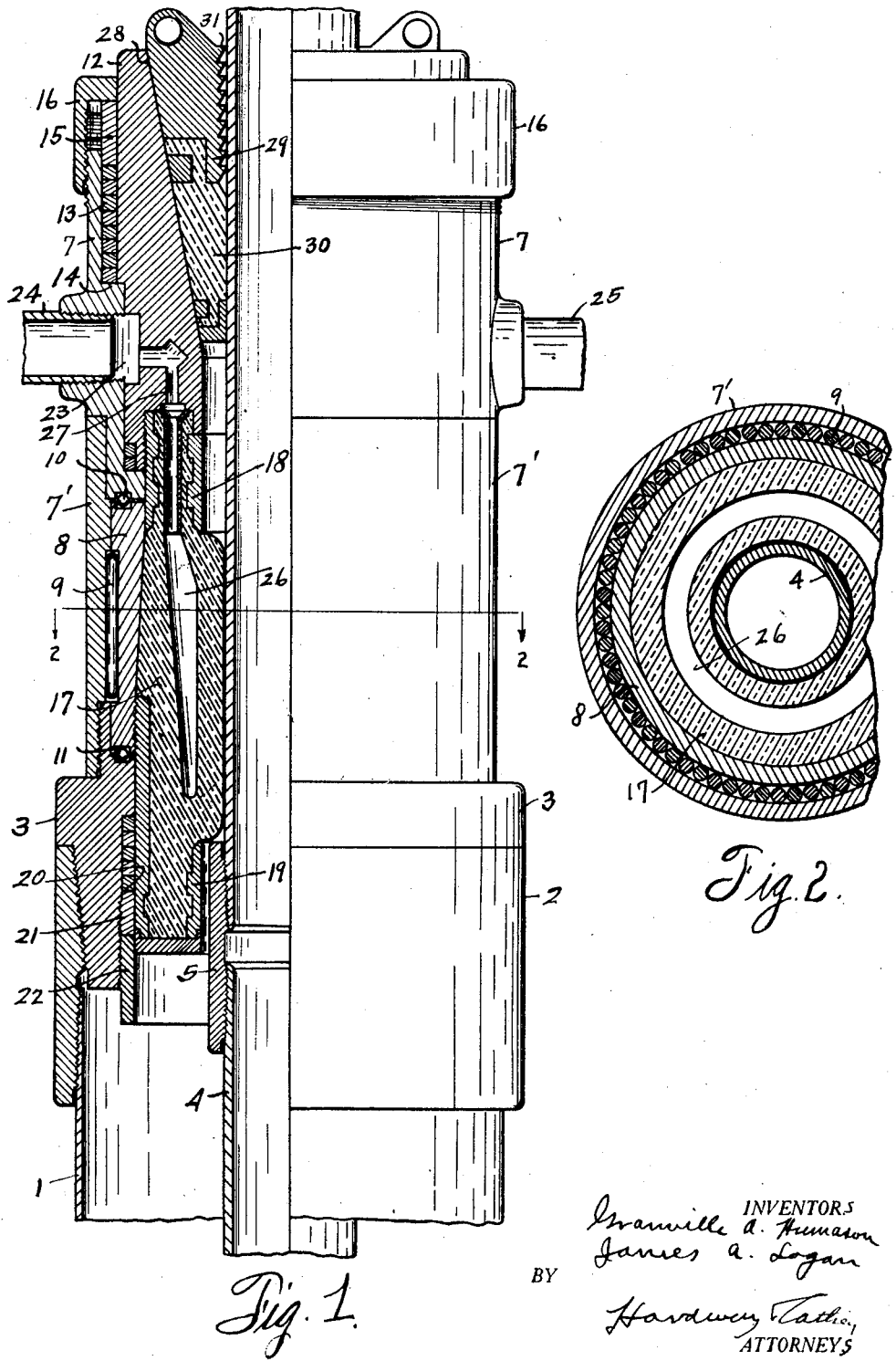

INVENTORS
Granville A. Humason
James A. Logan
BY
Hardway Cathey
ATTORNEYS

Patented Dec. 15, 1931

1,836,470

UNITED STATES PATENT OFFICE

GRANVILLE A. HUMASON AND JAMES A. LOGAN, OF HOUSTON, TEXAS

BLOW-OUT PREVENTER

Application filed February 24, 1930. Serial No. 430,721.

This invention relates to new and useful improvements in a blow out preventer.

One object of the invention is to provide a blow out preventer of the character described adapted to be connected to the upper end of a casing in a well bore and equipped with means for forming a tight seal between the casing and the drill stem or the grief pipe by means of which said stem is driven, or other inner pipe, so that in case strong gas pressure be encountered, the fluid may be prevented from blowing out between the casing and the stem or other inner pipe, within the casing.

Another object of the invention is to provide in a casing head, a novel type of expansible packer, the pressure of which against the inner pipe, drill stem or grief pipe may be controlled at will through the application of fluid under pressure thereto.

With the above and other objects in view the invention has particular relation to certain novel features of construction, operation and arrangement of parts an example of which is given in this specification and illustrated in the accompanying drawings wherein:

Figure 1 shows a side elevation partly in section, of one type of the casing.

Figure 2 shows a transverse sectional view thereof taken on the line 2—2 of Figure 1.

Figures 3, 4:
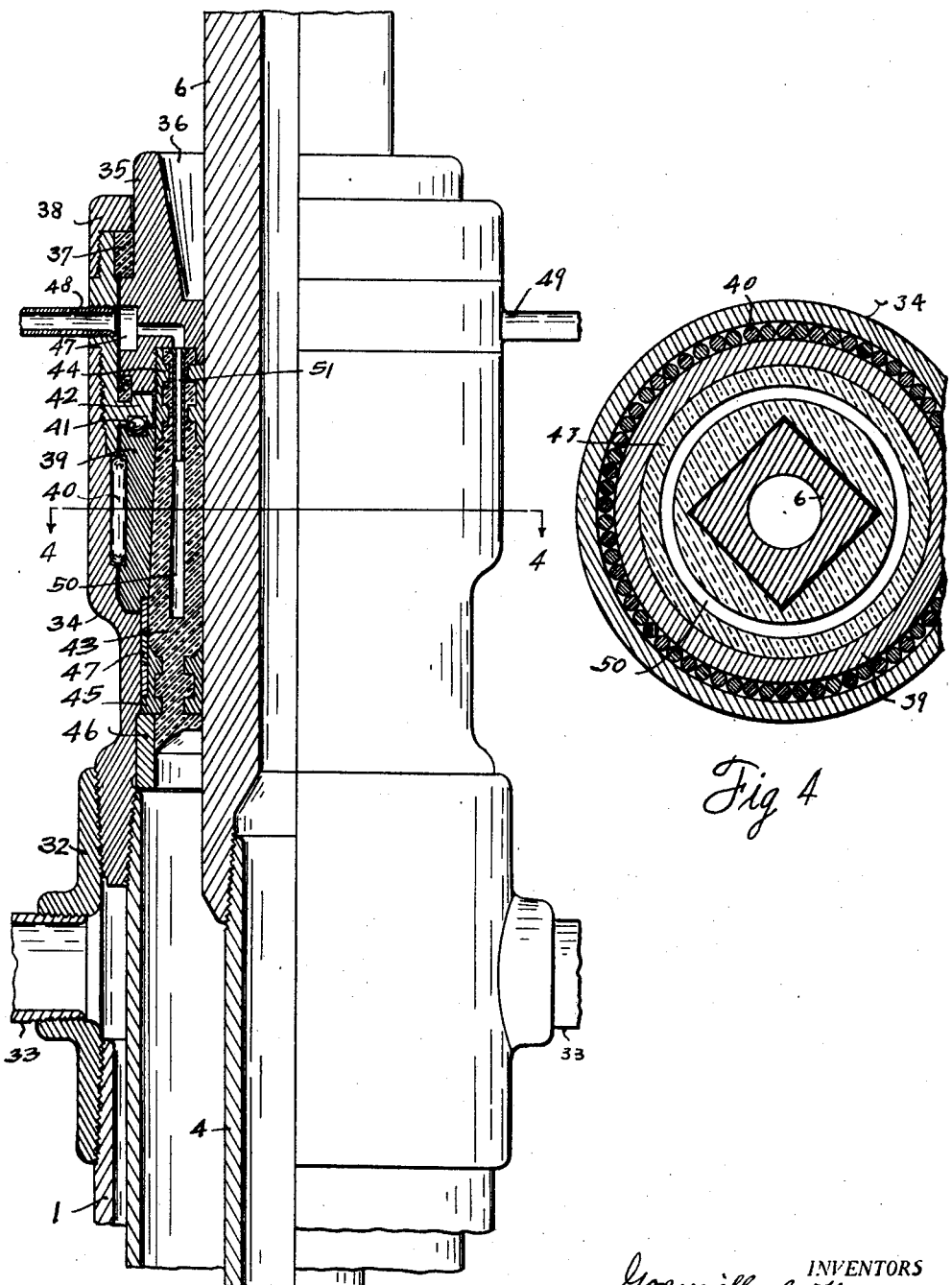
Figure 3 shows a side elevation partly in section of a slightly modified form of the apparatus.
Figure 4 shows a transverse sectional view taken on the line 4—4 of Figure 3.

Referring now more particularly to the drawings wherein like numerals of reference designate similar parts in each of the figures, the numeral 1 designates a casing in a well bore and screwed onto the upper end thereof there is the coupling 2 into the upper end of which there is screwed the gland 3. As illustrated there is a tubular drill stem 4 shown in the casing whose sections are connected by ordinary couplings as 5. The drill stem may be rotated by any type of rotary drilling machine and is operatively connected therewith, by means of a grief stem 6 of well known construction, attached to the upper end of the drill stem.

Screwed onto the upper end of the gland 3 there is a tubular housing formed of the upper and lower sections 7, 7' whose adjacent ends telescope together. Within the housing section 7' there is a sleeve-like bearing ring 8 having the roller bearings 9 between it and said housing section, and having the upper and lower ball bearings 10, 11 between its ends and the adjacent lower end of the section 7 above and the upper end of the gland 3 beneath. There is a spider 12 within the upper end of the housing 7 and around this spider and between it and the housing there are the packing rings 13 which are clamped between the inside supporting shoulder 14 in the housing and the gland 15 above said gland in turn being retained in place by the clamp nut 16 which is screwed onto the upper end of the housing 7 and closely surrounds the spider 12 and clamps said gland 15 in place.

There is a packing sleeve designated generally by the numeral 17 and formed of rubber or other suitable expansible material. The upper and lower ends of this packing sleeve are anchored to the upper and lower ferrules 18, 19 onto the former of which the lower end of the spider 12 is screwed and the ferrule 19 is extended upwardly about the packing sleeve and surrounds the same and is screwed into the lower end of the bearing ring 8. Around the ferrule 19 there is a suitable packing 20 which is maintained in place by the lock nuts 21, 22, which are screwed into the lower end of the gland 3.

The spider 12 has an outside annular channel 23 into which the inlet line 24 is connected and from which the relief line 25 leads. The packing sleeve 17 has an internal annular pocket 26 and leading from the channel 23 there are a plurality of passageways 27 which enter said pocket and through which fluid under pressure may be admitted into said pocket to expand the packer sleeve 17.

It is to be observed that should the inner pipe or drill stem 4 be rotated the packing sleeve 17 may rotate with it, the bearing ring 8 and the spider 12 being mounted to rotate as above stated and since the ferrule 19 surrounds the packing sleeve 17 and is connected to the lower end of the bearing ring 8 there will be no frictional wear on the sleeve 17 during this rotation. In case of a threatened blow out, that is, in case the internal pressure begins to escape up between the casing and drill stem, fluid such as steam, compressed air or other fluid may be forced through the inlet line 24 into the pocket 26 to expand the packing sleeve securely against the drill stem, so as to prevent the escape of the well fluid under pressure. While this pressure is so applied, the outlet line 25 should be closed by a suitable valve provided for the purpose. By opening said valve referred to the pressure may be relieved from the sleeve 17 when desired.

The spider 12 has an upwardly flared seat 28 to receive the wedge shaped slips 29. Incorporated into these slips are the sections of packing 30 which fit closely about the drill stem and when the slips are seated in place this packing 30 forms an additional seal around the drill stem to be used either in conjunction with or independent of the sleeve 17. The slips 29 have the inside teeth 31 to engage the drill stem to hold the slips seated in place. These slips referred to are primarily intended to be used only in case the sleeve 17 should, for any reason, fail to restrain the pressure endeavoring to escape from the well.

Referring to Figures 3 and 4, a coupling 32 is connected to the upper end of the casing 1 and this coupling is provided with one or more outlet lines 33. In this form, the housing 34 has its lower end screwed into the upper end of the coupling 32, and fitted within the upper end of said housing 34 there is the spider 35 having the upwardly flared head 36 to receive slips, such as 29, for the purpose stated. Between the upper end of the housing 34 and the slips 35 there is a packer 37, which is retained in place by a clamp nut 38, which is screwed onto the upper end of the housing 34. Within the housing 34 there is a sleeve like bearing ring 39 having the roller bearings 40 between it and the housing and also having the upper ball bearings 41 between the upper end thereof and an inside shoulder 42 within said housing in this type of blow out preventer. The packing sleeve is designated by the numeral 43 and is formed of rubber or other suitable expansible material having its upper and lower ends anchored to the respective ferrules 44, 45 the former of which is screwed into the lower end of the spider 35 and the latter of which rides on a suitable bearing ring 46. Suitable packing rings as 47 surround the lower end of this packing sleeve 43 and is interposed between it and the housing the spider 35 has an outside annular frame 47 into which the inlet line 48 and the outlet line 49 are connected.

The packing sleeve 46 has an internal annular pocket 50 and leading from the channel 47 there are a plurality of passageways 51 which enter said pocket and through which fluid under pressure may be admitted into said pocket to expand the packer sleeve 43.

The purpose and method of operation of the type of blow out preventer shown in Figures 3 and 4 are substantially the same as that of the type shown in Figures 1 and 2 and hereinabove explained.

The drawings and description disclose what we now consider to be a preferred form of the invention by way of illustration only while the broad principle of the invention will be defined by the appended claims.

What we claim is:—

1. Apparatus for forming a seal between an outer casing set in a well bore and an inner string, and including a housing connected to the upper end of the casing, a packing sleeve within the housing, and shaped to surround said string and having an internal chamber, means for introducing fluid, under pressure, into said chamber to expand the packing sleeve, said sleeve being mounted to rotate with the inner string relative to said housing.

2. Apparatus for forming a seal between an outer casing set in a well bore and an inner string, and including a housing connected to the upper end of the casing, a packing sleeve within the housing, and shaped to surround said string and having an internal chamber, means for introducing fluid, under pressure, into said chamber to expand the packing sleeve, said sleeve being mounted to rotate with the inner string relative to said housing and means around the sleeve to prevent friction on its external surface during the rotation thereof.

3. Apparatus for forming a seal between an outer casing set in a well bore, and an inner string, and including a housing connected to the casing, a sleeve like bearing ring within the housing, a packing sleeve within said bearing ring, formed of expansible material, and shaped to surround the inner string, said sleeve having an internal chamber, means for introducing fluid, under pressure, into said chamber, said bearing ring and sleeve being rotatable, as a unit, in said housing and said ring shielding said packing sleeve against frictional contact with said housing.

In testimony whereof we have signed our names to this specification.

GRANVILLE A. HUMASON.
JAMES A. LOGAN.